United States Patent Office 3,281,456
Patented Oct. 25, 1966

3,281,456
PROCESS FOR THE PRODUCTION OF ALKYL ARALKYL PHTHALATES
Gustav Renckhoff, Witten (Ruhr), and Wolfgang Wolfes, Witten-Bommern, Germany, assignors to Chemische Werke Witten G.m.b.H., Witten (Ruhr), Germany
No Drawing. Filed June 29, 1962, Ser. No. 206,519
Claims priority, application Germany, Aug. 5, 1961, C 24,809
16 Claims. (Cl. 260—475)

The present invention relates to a process for the production of alkyl aralkyl phthalates wherein the alkyl residue is derived from a monohydric, saturated aliphatic alkanol having from 1 to 12 carbon atoms and the aralkyl residue represents a benzyl residue or a benzyl residue substituted by alkyl groups or halogen atoms.

It is known to prepare alkyl aralkyl phthalates, for example, butyl benzyl phthalate, by reacting phthalic acid anhydride first with an alkanol to form acid alkyl phthalate and subsequently reacting the latter in the form of its sodium salt in a solvent, such as water or alcohol, with an aralkyl halide to form the mixed alkyl aralkyl phthalate. Due to secondary reactions of the aralkyl halide with the solvent, the yield is reduced and the mixed ester formed is rendered impure by the formation of by-products, particularly when substituted benzyl chlorides, for example dimethylbenzyl chloride, are reacted instead of benzyl chloride.

It has now been found that alkyl aralkyl phthalates, wherein the alkyl residue is derived from a monohydric, saturated, aliphatic alkanol having from 1 to 12 carbon atoms, and the aralkyl residue represents a benzyl residue or a benzyl residue substituted by alkyl groups or halogen atoms, may be prepared with an excellent yield and outstanding degree of purity by reacting the potassium or lead salts of the acid alkyl phthalates with an aralkyl halide in an aromatic solvent, preferably toluene or xylenes, that has a boiling point between 80 and 150° C.

The aralkyl halides which may be employed include, for example, benzyl chloride, mono- or dialkyl-substituted benzyl chloride, or benzyl chloride-substituted by halogen, particularly chlorine, in the nucleus.

While most metal salts of the acid alkyl phthalates, particularly the sodium salts, cannot be reacted with aralkyl halides in aromatic hydrocarbons since they are extremely difficult to dissolve, or are obtained in a very swelled condition and cannot be stirred, the potassium and lead salts may surprisingly be made to react smoothly with the dialkyl halides, since they form finely crystalline, easily stirrable deposits.

The reaction of the acid alkyl phthalates with the aralkyl halides in aromatic hydrocarbons as the solvent has the considerable advantage that no aralkyl halide is lost as a consequence of secondary reactions and that the alkyl aralkyl phthalates are not rendered impure by by-products. Another essential advantage of the present invention is that, during the preparation of, for example, benzyl butyl phthalate, it is not necessary to start from pure benzyl chloride, but that a crude benzyl chloride, dissolved in excess toluene, may be utilized, such as is obtained when toluene is chlorinated to benzyl chloride, during exposure to light, only to a fraction, for example, to approximately 20%. It is equally advantageous to utilize the reaction products of formaldehyde and hydrochloric acid with aromatic hydrocarbons for the reaction according to the present invention, such as toluene, or xylene, which are obtained generally in the form of a solution in excess aromatic hydrocarbon. This is particularly advantageous when dimethylbenzyl esters are intended to be produced, since in the chloromethylation of technical, mixed xylene with formaldehyde and hydrochloric acid, preferably only the m-xylene reacts with the formation of 2,4-dimethylbenzyl chloride, whereas the o- and p-xylene are not affected. The excess xylene, obtained after the reaction of the reaction mixture with the potassium salt of the acid alkyl phthalate is, consequently, strongly enriched with the valuable p-xylene and thus receives a substantial increase in value.

For the preparation of the alkyl aralkyl phthalates according to the present invention, phthalic acid anhydride is first heated with an alkanol having from 1 to 12 carbon atoms in an equivalent amount to temperatures of from 100 to 120° C. to form the acid partial ester. The latter is thereupon dissolved in the aromatic hydrocarbon, serving as solvent, and having a boiling point between 80 and 150° C., preferably toluene or xylene, and reacted with potassium carbonate. After the azeotropic removal of the reaction water formed, the aralkyl halide is added to the suspension of the potassium salt of the acid alkyl phthalate and heated, for the completion of the reaction, to 100 to 150° C., expediently to the boiling point of the aromatic hydrocarbon used. For accelerating the reaction, a tertiary amine, preferably triethylamine, may be added in small amounts as catalyst in a conventional manner.

Upon the completion of the reaction, the potassium chloride formed is dissolved by the addition of water, and the solvent is distilled off after separation of the aqueous phase. The remaining ester is refined and purified according to known methods.

Instead of the potassium salt, the lead salt may also be formed by the addition of lead carbonate and reaction with the aralkyl halide, but the use of the potassium salts is generally more expedient for reasons of economics.

The alkyl aralkyl phthalates made according to the present invention may be utilized or employed as softeners, for example, for polyvinyl chloride, and are distinguished by their low dissolving power for bitumen.

It is, accordingly, an object of the present invention to provide a new and improved process for the production of alkyl aralkyl phthalates wherein the alkyl residue is derived from a monohydric, saturated, aliphatic alkanol having from 1 to 12 carbon atoms and the aralkyl residue represents a benzyl residue or a benzyl residue substituted by alkyl groups or halogen atoms.

Other objects will become apparent as the description proceeds and with reference to the following examples which serve to further illustrate the invention without limiting the same.

*Example I*

148 g. of phthalic acid anhydride (1 mole) is heated to 90 to 100° C. with 75 g. of n-butanol (1 mole) while stirring slowly in a flask provided with a stirrer, a reflux cooler with water separator, and a thermometer and is maintained at that temperature until a completely clear solution has been formed. Thereupon, cooling to room temperature is effected and 546 g. of a toluene chlorinated to 25.5% by weight in the lateral chain (1.1 moles benzyl chloride) and, thereafter, 83.5 g. of water-free $K_2CO_3$ (0.6 mole) are added to the phthalic acid monobutyl ester formed. During a lively $CO_2$ formation, the potassium salt of the phthalic acid partial ester is formed.

The reaction water formed (0.5 mole) is azeotropically distilled off while stirring vigorously and, upon the addition of 2 ml. of triethylamine, the reaction is completed after 12 hours of stirring at boiling temperature. After the mixture has been cooled, alkali free washing with cold water is effected. The toluene layer is separated, the toluene distilled off in a moderate vacuum and the residue treated in a water jet vacuum at 130 to 160° C.

with steam. An almost colorless phthalic acid benzyl-butyl-mixed ester is obtained.

Yield _____ 284 g., equal to 91% of the theoretical yield.
Acid number _____ Below 1.
Saponification number ____ Calculated: 359. Experimental: 357.

Example II

The same batch is utilized as in Example I, except that 160 g. of $PbCO_3$ (0.6 mole) is employed for the salt formation instead of $K_2CO_3$.

Upon the completion of the reaction, prior to washing with water, suction is effected over a glass frit so as to separate the lead salts. The mixed ester obtained has a yellow coloration.

Yield _____ 220 g., equal to 70.6% of the theoretical yield.
Acid number _____ Below 1.
Saponification number ___ Calculated: 359. Experimental: 365.

Example III 592 g. of phthalic acid anhydride (4 moles) is added to 368 ml. of n-butanol (4 moles) in a flask provided with a stirrer, a reflux cooler with a water separator, and a thermometer, slowly heated to 90 to 100° C. and maintained at that temperature until a completely clear solution has been formed. The monobutyl phthalate formed is added to 1.5 liters of mixed xylene and the potassium salt of the partial ester is formed by the addition of 332 g. of water-free $K_2CO_3$ (2.4 moles). Added to the water-free reaction mixture are 1.3 kg. of a technical, mixed xylene (4.4 moles) that has been chloromethylated to 52% by weight, and 5 ml. of triethylamine, and the reaction is completed, while stirring vigorously at boiling temperature, after 10–12 hours. After cooling, alkali-free washing is effected, the xylene layer separated, and the xylene distilled in a moderate vacuum. The easily boiling secondary constituents are removed by steam distillation in vacuo to 160° C. After a single carbon treatment for purification, a slightly yellow-colored phthalic acid dimethylbenzyl-butyl-mixed ester is obtained.

Yield _____ 1,252 g., equal to 92% of the theoretical yield.
Acid number _____ Below 1.
Saponification number ___ Calculated: 329. Experimental: 324.

Example IV 148 g. of phthalic acid anhydride is reacted with 108 ml. of amyl alcohol to give a partial ester, as described in Example I, and the potassium salt is esterified to phthalic acid benzyl-amyl-mixed ester under the same conditions as described therein.

Yield _____ 280 g., equal to 86% of the theoretical yield.
Acid number _____ Below 1.
Saponification number __ Calculated: 343.5. Experimental: 341.

Example V

As described in Example I, 1 mole of the potassium salt of mono-2-ethylhexyl phthalate is formed and reacted with 546 g. of a 25.5% benzyl chloride. The phthalic acid-2-ethylhexyl-butyl-mixed ester is obtained as a yellow-colored fluid.

Yield _____ 339 g., equal to 92% of the theoretical yield.
Acid number _____ Below 1.
Saponification number __ Calculated: 304.5. Experimental: 301.

Example VI 148 g. of phthalic acid anhydride is reacted with 92 ml. of butanol to give the partial ester thereof and the potassium salt is formed upon the addition of 400 ml. of xylene as solvent with 86 g. of water-free $K_2CO_3$. After the reaction water has been removed, 159 g. of p-xylyl chloride (1.1 mole) and 2 ml. of triethylamine are added. After a reaction time of 12 hours, while stirring well at boiling temperature, cooling and alkali-free washing with water are effected and work-up is provided for in the usual manner.

Yield _____ 290 g., equal to 89.9% of the theoretical yield.
Acid number _____ Below 1.
Saponification number _ Calculated: 343.5. Experimental: 345.

Example VII

To 1 mole of the water-free potassium salt of monobutyl phthalate in xylene, as described in Example VI, are added 193 g. of chloro-m-xylyl chloride (isomer mixture) and 2 ml. of triethylamine. Further treatment is effected as indicated in the preceding examples.

Yield _____ 298 g., equal to 82.5% of the theoretical yield.
Acid number _____ Below 1.
Saponification number _ Calculated: 310.5. Experimental: 306.

While we have described our invention with reference to the above examples, etc., it will be understood that we do not wish to be limited thereto since many modifications may be made by one skilled in the art within the scope of our invention, and we intend to include all such modifications and changes which fall within the scope of the appended claims.

We claim:

1. A process for the production of alkyl aralkyl phthalates wherein the alkyl residue is derived from a monohydric, saturated, aliphatic alkanol having from 1 to 12 carbon atoms and the aralkyl residue is selected from the group consisting of a benzyl residue, benzyl residues substituted by alkyl groups and benzyl residues substituted by halogens which comprises heating phthalic acid anhydride to a temperature of between approximately 100 and 120° C. in the presence of an equivalent amount of a monohydric, saturated, aliphatic alkanol having from 1 to 12 carbon atoms to form the respective acid alkyl phthalate, dissolving said acid alkyl phthalate in an aromatic hydrocarbon solvent having a boiling point between approximately 80 and 150° C., reacting said acid alkyl phthalate with a compound selected from the group consisting of potassium carbonate and lead carbonate to form the respective salt of said acid alkyl phthalate, azeotropically removing the reaction water formed, reacting said salt of the acid alkyl phthalate with an aralkyl halide selected from the group consisting of the benzyl halides, the benzyl halides substituted by alkyl groups and the benzyl halides substituted by halogens at a temperature of approximately the boiling point of said solvent to form the respective alkyl aralkyl phthalate and the respective halide of potassium or lead, dissolving said respective halide in water, removing the aqueous phase from the reaction mixture, and distilling off said aromatic hydrocarbon solvent.

2. A process according to claim 1, wherein said aromatic hydrocarbon solvent is selected from the group consisting of xylene and toluene and wherein said salt of the acid alkyl phthalate is reacted with said aralkyl halide at a temperature of between approximately 100° and 150° C.

3. A process according to claim 1, wherein a tertiary amine catalyst is added to the reaction mixture along with said aralkyl halide.

4. A process for the production of alkyl aralkyl phthalates wherein the alkyl residue is derived from a monohydric, saturated, aliphatic alkanol having from 1 to 12 carbon atoms and the aralkyl residue is selected from the group consisting of a benzyl residue, benzyl residues substituted by alkyl groups and benzyl residues substituted by halogens which comprises heating phthalic acid anhydride to an elevated temperature in the presence of an equivalent amount of a monohydric, saturated, aliphatic alkanol having from 1 to 12 carbon atoms to form the respective acid alkyl phthalate, dissolving said acid alkyl phthalate in an aromatic hydrocarbon solvent having a boiling point between approximately 80 and 150° C., reacting said acid alkyl phthalate with a compound selected from the group consisting of potassium carbonate and lead carbonate to form the respective salt of said acid alkyl phthalate, azeotropically removing the reaction water formed, reacting said salt of the acid alkyl phthalate with an aralkyl halide selected from the group consisting of the benzyl halides, the benzyl halides substituted by alkyl groups and the benzyl halides substituted by halogens at a temperature of approximately the boiling point of said solvent to form the respective alkyl aralkyl phthalate and the respective halide of potassium or lead, dissolving said respective halide in water, removing the aqueous phase from the reaction mixture, and distilling off said aromatic hydrocarbon solvent.

5. A process for the production of alkyl aralkyl phthalates wherein the alkyl residue is derived from a monohydric, saturated, aliphatic alkanol having from 1 to 12 carbon atoms and the aralkyl residue is selected from the group consisting of a benzyl residue, benzyl residues substituted by alkyl groups and benzyl residues substituted by halogens which comprises heating phthalic acid anhydride to an elevated temperature in the presence of an equivalent amount of a monohydric, saturated, aliphatic alkanol having from 1 to 12 carbon atoms to form the respective acid alkyl phthalate, dissolving said acid alkyl phthalate in an aromatic hydrocarbon solvent having a boiling point between approximately 80 and 150° C., reacting said acid alkyl phthalate with a compound selected from the group consisting of potassium carbonate and lead carbonate to form the respective salt of said acid alkyl phthalate, azeotropically removing the reaction water formed, reacting said salt of the acid alkyl phthalate with an aralkyl halide selected from the group consisting of the benzyl halides, the benzyl halides substituted by alkyl groups and the benzyl halides substituted by halogens at a temperature of approximately the boiling point of said solvent to form the respective alkyl aralkyl phthalate and the respective halide of potassium or lead, and recovering said alkyl aralkyl phthalate from the reaction mixture.

6. A process according to claim 5, wherein said salt of the acid alkyl phthalate is reacted with said aralkyl halide at a temperature of between approximately 100° and 150° C.

7. A process for the production of alkyl aralkyl phthalates which comprises reacting in an aromatic hydrocarbon solvent having a boiling point between approximately 80° and 150° C. a salt, selected from the group consisting of potassium and lead, of a monoalkyl ester of phthalic acid with an aralkyl halide.

8. A process according to claim 7 in which the alkyl group of the monoester contains 1 to 12 carbon atoms.

9. A process according to claim 7 in which the aromatic hydrocarbon solvent is an alkyl benzene.

10. A process according to claim 7 in which the aralkyl halide is a benzyl halide.

11. A process according to claim 7 in which the aralkyl halide is benzyl chloride.

12. A process according to claim 7 in which the aralkyl halide is an alkyl-substituted benzyl halide.

13. A process according to claim 7 in which the reaction is effected in the presence of a tertiary amine catalyst.

14. A process according to claim 7 in which the alkyl group of the monoester is butyl.

15. A process according to claim 7 in which the alkyl group of the monoester is amyl.

16. A process according to claim 7 in which the alkyl group of the monoester is 2-ethylhexyl.

References Cited by the Examiner

UNITED STATES PATENTS

| 2,073,937 | 3/1937 | Kyrides | 260—485 X |
| 2,120,756 | 6/1938 | Kyrides | 260—475 |
| 2,617,820 | 11/1952 | Gamrath et al. | 260—475 |
| 2,802,860 | 8/1957 | Stack et al. | 260—475 |

OTHER REFERENCES

Migrdichian: "Organic Synthesis," 1957, p. 326.

LORRAINE A. WEINBERGER, *Primary Examiner.*

LEON ZITVER, *Examiner.*

R. E. MASSA, T. L. GALLOWAY, *Assistant Examiners.*